UNITED STATES PATENT OFFICE.

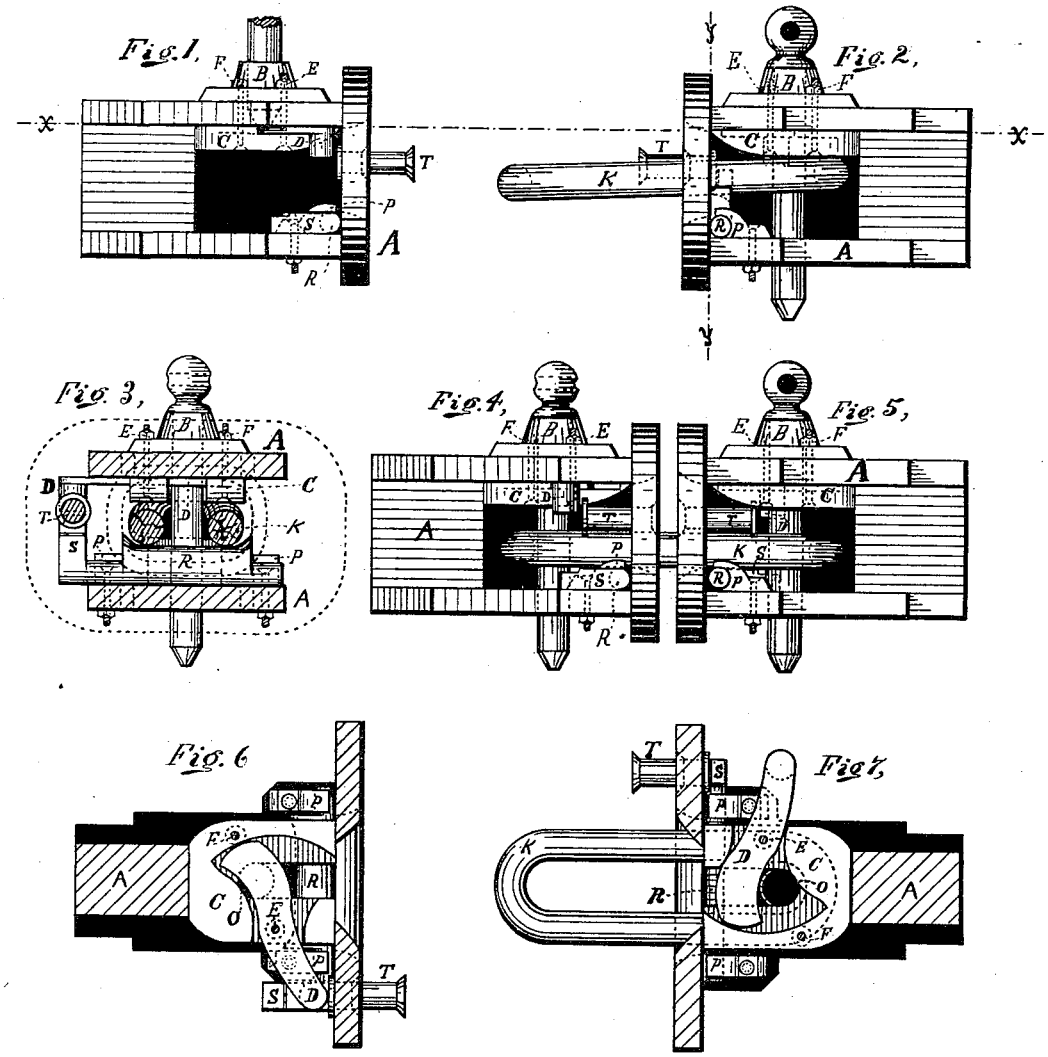

ICHABOD ANDREWS, OF DUNDEE, NEW YORK.

CAR-COUPLING.

SPECIFICATION forming part of Letters Patent No. 273,700, dated March 13, 1883.

Application filed January 24, 1883. (No model.)

*To all whom it may concern:*

Be it known that I, ICHABOD ANDREWS, a citizen of the United States, residing at Dundee, in the county of Yates and State of New York, have invented a new and useful Improvement in Car-Couplers, of which the following is a specification.

My invention relates to improvements in automatic car-couplers in which the old link and pin are used in connection with other adjustments; and the objects of my improvements are, first, to provide, without material change of the common draw-head now in use, an automatic coupler; and, second, to afford facilities for the proper adjustments of link and pin before coupling. I attain these objects by the mechanism illustrated in the accompanying drawings, in which—

Figures 1 and 2 are elevations of the draw-head embodying my device, with the link and pin fully adjusted before coupling. Fig. 3 is a front sectional elevation on the line *y y*, Fig. 2. Figs. 4 and 5 are elevations of the draw-heads embodying my device, with the link and pin in position after coupling. Figs. 6 and 7 are sectional plan views on the line *x x*, Figs. 1 and 2, and in same position of adjustment.

Similar letters refer to similar parts throughout the several views.

As the draw-heads A are identical, and vice versa, a description of the one will refer to the other. I fasten upon and beneath the upper portion of them, by means of the bolts E F, the armlet-plate B and U-shaped plate C, referred to hereinafter. Next the draw-head A, pivoted upon the bolt E, and swinging horizontally within a suitable recess of sufficient depth cut in plate C, is carried the cut-off lever D, which is operated backward by means of the independent sliding bolt T, passing through the face part of draw-head A. The armlet-plate B has for its office to support the pin I when the lever D is moved across the pin-opening O, as shown in Figs. 1 and 6. In the corner next the face, and to the lower plane of draw-head A, are bolted caps P, which, in connection with the draw-head, form suitable boxes for the crank-shaft R to turn in. This crank-shaft between the caps P P is radially flattened in width, so when turned upward it will raise the link K the requisite height to enter the opposite draw-head, while the inner end of link in this position is held down by coming in contact with the lower side of plate C, Figs. 2 and 3. In the same radii, and at one end of same shaft R, is an arm or crank, S, which when raised upward comes in contact with and can be thrown downward by the bolt T sliding in, as Figs. 3 and 4.

The operation of the device is as follows: Before coupling, the link K is placed in either draw-head and the crank-shaft R raised, which elevates the link and forces the bolt T outward, as shown in Fig. 2, while in the opposite draw-head the lever D is swung forward again, forcing the bolt T outward and stopping off the pin-opening O. The pin is then set in elevation, as shown in Fig. 1. The cars now coming together, the link K enters the opening in the opposite draw-head, the bolts T T are driven inward, the one turning the crank-shaft down to a horizontal position, thus relieving the link, while the other at same time swings the lever D from across the pin-opening O and the pin drops immediately into position, as shown in Figs. 4 and 5, and the coupling is complete.

I am aware that prior to my invention couplers have been made using a sliding bolt in which said bolt has been a part of cam elevating a plate carrying the link. Such I do not claim; but What I do claim, and wish to secure by Letters Patent, is—

1. In a car-coupler, the independent sliding bolt T, in combination with the cut-off lever D and crank-shaft R, substantially as and for the purpose set forth.

2. In a car-coupler, the combination of the draw-head A, armlet-plate B, recessed plate C, bolts E and F, lever D, and bolt T, substantially as and for the purpose set forth.

3. The combination, in a car-coupler, of the draw-head A, caps P P, crank-shaft R, having arm or crank S, and independent bolt T, substantially as and for the purpose set forth.

ICHABOD ANDREWS.

Witnesses:
E. HORTON,
W. B. STARKEY.